(12) United States Patent
Greiner

(10) Patent No.: US 11,177,744 B2
(45) Date of Patent: Nov. 16, 2021

(54) METHOD FOR STARTING AND OPERATING A BLDC MOTOR AND BLDC MOTOR

(71) Applicant: NIDEC DRIVEXPERT GMBH, Ilmenau (DE)

(72) Inventor: Martin Greiner, Ilmenau (DE)

(73) Assignee: Nidec Drivexpert GmbH, Ilmenau (DE)

( * ) Notice: Subject to any disclaimer, the term of this patent is extended or adjusted under 35 U.S.C. 154(b) by 14 days.

(21) Appl. No.: 16/754,492

(22) PCT Filed: Sep. 28, 2018

(86) PCT No.: PCT/DE2018/000276
§ 371 (c)(1),
(2) Date: Apr. 8, 2020

(87) PCT Pub. No.: WO2019/072327
PCT Pub. Date: Apr. 18, 2019

(65) Prior Publication Data
US 2020/0395876 A1 Dec. 17, 2020

(30) Foreign Application Priority Data
Oct. 12, 2017 (DE) ............................ 102017009512

(51) Int. Cl.
*H02P 6/20* (2016.01)
*H02P 6/21* (2016.01)

(52) U.S. Cl.
CPC ..................................... *H02P 6/21* (2016.02)

(58) Field of Classification Search
CPC ................. H02P 1/04; H02P 6/15; H02P 6/21
See application file for complete search history.

(56) References Cited

U.S. PATENT DOCUMENTS

| 5,821,710 A | 10/1998 | Masuzawa et al. |
| 7,315,142 B2 | 1/2008 | Lindemann et al. |
| (Continued) | | |

FOREIGN PATENT DOCUMENTS

| DE | 19743314 A1 | 4/1998 |
| DE | 10308859 A1 | 9/2004 |
| (Continued) | | |

*Primary Examiner* — Muhammad S Islam
(74) *Attorney, Agent, or Firm* — Laurence A. Greenberg; Werner H. Stemer; Ralph E. Locher

(57) ABSTRACT

A BLDC motor and a method for starting and operating the motor. The motor has a rotor with exciter magnets, a stator with at least three stator coils, and a control and evaluation unit. The method carries out an initialization phase with a defined start time, initial starting field angle of the stator magnetic field and angle rising rate. A partial cycle is carried out with a rising phase that increases a current field angle with a change in voltage application to the stator coils. An analysis phase keeps the current field angle constant. The method continuously records a difference in current between two phase currents of a same direction of flow, the evaluation unit analyzes the recorded difference for the presence of a current eye. Immediate commutation takes place when a current eye is detected or where without detection after a pre-definable time interval has elapsed. The analysis phase is terminated after commutation is carried out. The partial cycle is repeatedly carried out until the final field angle has increased to a value of 360° to define a total cycle.

2 Claims, 3 Drawing Sheets

(56) References Cited

U.S. PATENT DOCUMENTS

| | | |
|---|---|---|
| 2010/0109589 A1 | 5/2010 | Harada |
| 2014/0217936 A1* | 8/2014 | Okamoto ............ H02P 29/0241 |
| | | 318/400.13 |
| 2016/0373034 A1* | 12/2016 | Tachibana .............. G03G 15/80 |

FOREIGN PATENT DOCUMENTS

| | | |
|---|---|---|
| DE | 102014107949 A1 | 12/2015 |
| EP | 2026461 A2 | 2/2009 |

* cited by examiner

| Partial Cycle No. | Starting Field Angle | End Field Angle | Active Phases | First Current Crossover Point | | Second Current Crossover Point | |
|---|---|---|---|---|---|---|---|
| | | | | Increasing Phase Current | Decreasing Phase Current | Increasing Phase Current | Decreasing Phase Current |
| 1 | 0° | 60° | U,V | Iv | Iu | Iu | Iv |
| 2 | 60° | 120° | U,V | Iw | Iu | Iu | Iw |
| 3 | 120° | 180° | V,W | Iw | Iv | Iv | Iw |
| 4 | 180° | 240° | W,V | Iu | Iv | Iv | Iu |
| 5 | 240° | 300° | W,U | Iu | Iw | Iw | Iu |
| 6 | 300° | 360° | U,W | Iv | Iw | Iw | Iv |

FIG. 3

METHOD FOR STARTING AND OPERATING A BLDC MOTOR AND BLDC MOTOR

BACKGROUND OF THE INVENTION

Field of the Invention

The invention relates to an arrangement and method for starting and operating a brushless direct current motor, also known in abbreviated form as BLDC motor.

The principal structure of a generic BLDC motor is known from the state of the art and comprises a fixed stator, which is formed by a plurality of stator coils, and a movable rotor, which is usually formed by permanent magnets. To generate a rotating magnetic field, the stator coils are controlled by an electronic circuit at staggered intervals. Due to the generated rotating field, a torque of the permanently excited rotor can be effected.

To provide the torque of the rotor, it is necessary to provide a rotating stator magnetic field and for this purpose a commutation and thus application of power and preferably polarity reversal of the stator coils are to be carried out. Here, commutation is tantamount to the switching-over to the next motor state. Different procedures are known to execute this task, such as block commutation and sine commutation in particular.

With regard to commutation, a distinction is made between sensor-controlled and sensorless commutation. In sensor-controlled commutation, a rotor position is detected by a sensor and the commutation is controlled on this basis of this detection.

BLDC motors known from the state of the art are often designed as three-phase systems, although a higher or lower number of phases can also be used depending on the application requirements.

A generic BLDC motor is known, for example, from the publication DE 197 43 314 A1. The motor described here has a stator with several stator magnetic poles and a winding for generating a rotating field in the stator magnetic poles as well as a rotor with a rotation axis and field permanent magnets which rotate in relation to the stator magnetic poles. In addition, a control circuit is provided for detecting the position of the magnetic poles of the field permanent magnet relative to the stator and for supplying position-depending electric power to the winding.

Publication EP 2 026 461 A2 discloses a method for the sensorless control of a three-phase machine in particular. The solution described provides that at least during the time of the converter switch positions, which are used for the evaluation of the rotor position, the electric power is conducted in two phases and at least one phase is dead. Information regarding the rotor or flux angle is determined by the subtraction of two voltage equations valid during different converter switch positions occurring in quick succession, wherein the two different converter switch positions have the same dead phase.

Furthermore a method for controlling a BLDC motor based on continuously updated commutation times is known from the publication DE 103 08 859 A1. In this arrangement, the time difference between two directly successive zero crossings, which indicate the points of the reversal of the induced voltage, is measured in the respective non-energized motor coil of two motor phases. Commutation takes place after half of this time difference has elapsed, calculated from the zero crossing of the measured second motor phase, and this procedure is consistently continued for all subsequent phases.

SUMMARY OF THE INVENTION

The task of the invention is to provide a method for starting and operating a BLDC motor, which functions in a stable and low-noise manner both in the start phase and in continuous operation, which can be carried out without prior knowledge of the rotor position and without the use of position sensors, which can be carried out with a rotor both in standstill and in motion, and which can also be used in a cost-effective manner.

In addition, it is the task of the invention to provide a BLDC motor which can be operated by applying such a method.

With regard to the method, the task is solved by the features described in the independent method claim. With regard to the BLDG motor, the task is solved by the features described in the independent device claim.

A method according to the invention for starting and operating a BLDC motor can be carried out by means of a BLDC motor which has a rotor, a stator and a control and evaluation unit. A BLDC motor within the meaning of this invention is a brushless direct current motor.

The rotor comprises at least one exciter magnet, preferably designed as a permanent magnet. The stator comprises at least three stator coils. The stator coils can be wired in star or delta connection in particular. A phase current can be applied to each of the at least three stator coils, wherein a rotating stator magnetic field can be generated by means of the stator coils.

As a result of the interaction of this stator magnetic field with the rotor field generated by the permanent-magnetically excited rotor, a torque of the rotor is produced. This torque assumes its maximum value when the rotor field and the stator field are in perpendicular position to each other.

The control and evaluation unit of the BLDC motor is used in particular to control the electrical parameters and to analyse the resulting signal curve. Preferably, it can be coupled to an output device such as a PC or laptop. The control and evaluation unit carries out a sequence of procedural steps which are defined by the method according to the invention.

The method for starting and operating a BLDC motor according to the invention includes the following steps:

a) carrying out an initialisation phase, in which a start time, an initial starting field angle of the stator magnetic field and an angle rising rate are defined, (b) carrying out a partial cycle, including b1) carrying out a rising phase, wherein a current field angle is increased with the angle rising rate until a final field angle is reached which exceeds a starting field angle by 60°, wherein the current field angle is increased by a change in the voltage application to the stator coils, wherein the starting field angle corresponds to the initial starting field angle when the rising phase is carried out for the first time and to a final field angle of a previous rising phase when it is carried out repeatedly, b2) carrying out an analysis phase, wherein the current field angle is kept constant on account of the voltage application to the stator coils being kept constant, wherein a difference in current between two phase currents of the same direction of flow is continuously recorded, wherein the control and evaluation unit analyses the recorded difference in current for the presence of a current eye, wherein the current eye is formed between the time of a first occurrence of a current difference of 0 between the two phase currents of the same direction of flow and the time of a second occurrence of a current difference of 0 between the two phase currents of the same direction of flow, wherein immediate commutation takes place when a current eye has been detected, or wherein, without detection of a current eye, commutation takes place after a pre-definable time interval has elapsed, wherein the analysis phase is terminated after commutation has been carried out, c) repeatedly carrying out the partial cycle, wherein the partial cycle is repeated until the final field angle has increased to a value of 360°, wherein the partial cycles together form a total cycle, d) repeatedly carrying out the total cycle.

In procedural step a) an initialization phase is carried out first, in which a start time, an initial starting field angle of the stator magnetic field and an angle rising rate are defined. The start time describes the time at which the first rising phase of the first partial cycle begins. Thus, the start time, which can also be referred to as the initial motor state time, is to be defined only once. The angle rising rate is the angle rate of the change of the magnetic field angle. It describes the time period within which the current field angle is increased to a final field angle which exceeds the starting field angle by 60°.

After the initialisation phase, a partial cycle is carried out in procedural step b), which is divided into a rising phase b1) and a subsequent analysis phase b2).

If the initial start field angle of the stator field was defined as a 0° angle position in the initialisation phase, the current field angle increases from a starting field angle of 0° to an end field angle of 60° within the rising phase of the first partial cycle. The starting angle thus corresponds to the initial starting field angle when the partial cycle is carried out for the first time. The increase of the current field angle by 60° is caused by a change in the voltage application to the stator coils, which leads to a torque of the rotor.

The execution of procedural step b1), i.e. the rising phase, is based on the consideration that the change in the current field angle has an influence on the state of motion of the rotor. The effects can be, for example, a rotary motion of a rotor previously being in standstill or an acceleration of a rotor that has already been in motion.

In the subsequent analysis phase b2) the current field angle is kept constant on account of the application of voltage to the stator coils being kept constant. In the first partial cycle, the constancy is thus kept at a current field angle of 60°. During the analysis phase, a difference in current between two phase currents of the same direction of flow is continuously recorded. If three stator coils are used, the phase currents flowing at two of the stator coils are thus recorded, whereas the phase current of the corresponding third stator coil is not included in the analysis. According to the invention, the two phase currents recorded have the same direction of flow and thus a coincident algebraic sign, whereas the third phase current, which is not taken into account, has an opposite direction of flow.

The control and evaluation unit examines the recorded difference in current for the presence of a current eye. A current eye in the sense of this invention is understood to be the area which is formed between the time of a first occurrence of a current difference of 0 between the two phase currents of the same direction of flow and the time of a second occurrence of a current difference of 0 between the two phase currents of the same direction of flow. This means that the initially lower phase current increases and the initially higher phase current decreases so that the difference between the phase currents decreases until both phase currents have the same value. This is the time of the first occurrence of a current difference of zero. Immediately after the first occurrence of a current difference of zero, the initially lower phase current is now higher than the initially higher phase current. Then, a drop in the initially lower phase current and an increase in the initially higher phase current follow so that the difference between the phase currents decreases again until both phase currents have again the same value. This is the time of the second occurrence of a current difference of 0.

The designation as a current eye is based on the typical shape when the course of these two currents is shown graphically.

According to the invention, the rotation of the stator magnetic field is not synchronous with that of the rotor field, since the stator magnetic field is first moved faster in each partial cycle during the rising phase and is kept constant in the subsequent analysis phase. This forces a faster change in the phase currents, which leads to the formation of the current eye.

If a current eye is detectable, immediate commutation takes place. The commutation causes the change to a next motor state. If no current eye is detected after a pre-definable time interval has elapsed, commutation also takes place and the motor changes to the next motor state.

After commutation has been carried out, the analysis phase is completed and thus the partial cycle b) is finished.

Subsequently, in accordance with the procedural step c) according to the invention, partial cycle b) is carried out repeatedly until the final field angle is increased to a value of 360° to form a total cycle. The increase of the final field angle to a value of 360° means a complete rotation of the stator magnetic field.

Since in a repeated execution of the partial cycle the starting field angle corresponds to the final field angle of the previous rising phase, the current field angle would increase from a starting field angle of 60° to a final field angle of 120° within the rising phase in the first repetition and thus in the second execution of the partial cycle, according to the definition made in the initialisation phase. The subsequent analysis phase would be carried out with the current field angle being kept constant at a value of 120° according to the procedure described above, wherein the analysed stator coil pair and thus the phase currents involved in the formation of the current eye change now.

These partial cycles are repeated until the final field angle takes on a value of 360°. All the partial cycles carried out in this procedure form a total cycle. If the stator of the BLDC motor has three stator coils and operates in six motor states, a total cycle consisting of six partial cycles is produced.

In procedural step d), the total cycle is also performed repeatedly. The final field angle of 360° last assumed in a total cycle also represents the starting field angle for the following total cycle of 0° so that it is not required to define a new initial starting field angle. For example, procedural step d) can be executed as often as desired.

However, it is also possible that procedural step d) is only repeated until a pre-definable motor speed is reached. Subsequently, the control and evaluation unit can switch over to another motor control procedure. In this variant, the method according to the invention is only used for the start phase.

Then, the subsequent motor control procedure does not have to be capable to start the motor if the rotor position or the state of motion is unknown.

The motor speed can also be monitored by means of the control and evaluation unit.

The method for starting and operating a BLDC motor according to the invention has the following advantages in particular.

A major advantage is that the starting process can be started without prior knowledge of the position of the rotor.

In connection with this, it is a further particular advantage that the method can be started with an unknown motion state of the rotor so that the rotor can be in standstill or can rotate forward or backward (catch on fly). The advantage of this method according to the invention is that it is particularly suitable for fan motors on vehicle radiators, which can assume motion states or positions that cannot be pre-defined due to the airflow and, nevertheless, must be capable to be started at any time.

According to the invention, the BLDC motor does not have to comprise a position sensor to carry out the method so that the constructional design can be simplified. Moreover, in contrast to other state-of-the-art methods for the sensorless control of a BLDC motor, no minimum speed is required for commutation.

Consequently, no time needs to be spent for aligning or measuring the rotor position before the motor is started so that the starting procedure can be significantly shortened.

A further advantage is that the BLDC motor operates at a particularly low noise level when using this method, both during its start and during continuous operation. This advantage also makes the method particularly suitable for fan motors of vehicle radiators.

In addition, the method is particularly robust against fluctuations in the load or supply voltage so that an oscillating state is reliably avoided.

The present invention also comprises a BLDC motor by means of which the method according to the invention is feasible. The BLDC motor comprises a rotor, a stator and a control and evaluation unit. The rotor has at least one permanent magnet and the stator has at least three stator coils, wherein always one phase current can be applied to each of the at least three stator coils and wherein a rotating stator magnetic field can be generated by the stator coils.

By means of the control and evaluation unit and by means of the three stator coils, an initialization phase, a partial cycle and a total cycle generated by a plurality of partial cycles can be carried out. Furthermore, the total cycle can be carried out repeatedly. The explanations on the method apply equally to the BLDG motor.

The subject matter of the method according to the invention and of the BLDC motor according to the invention and the subject matter of the application for protection also cover those variants in which the stator has more than three stator coils. The values for the final field angles, the number of partial cycles and the phase currents involved in the detection of a current eye then apply in the appropriate resulting manner.

DETAILED DESCRIPTION OF THE INVENTION

Figure 1:
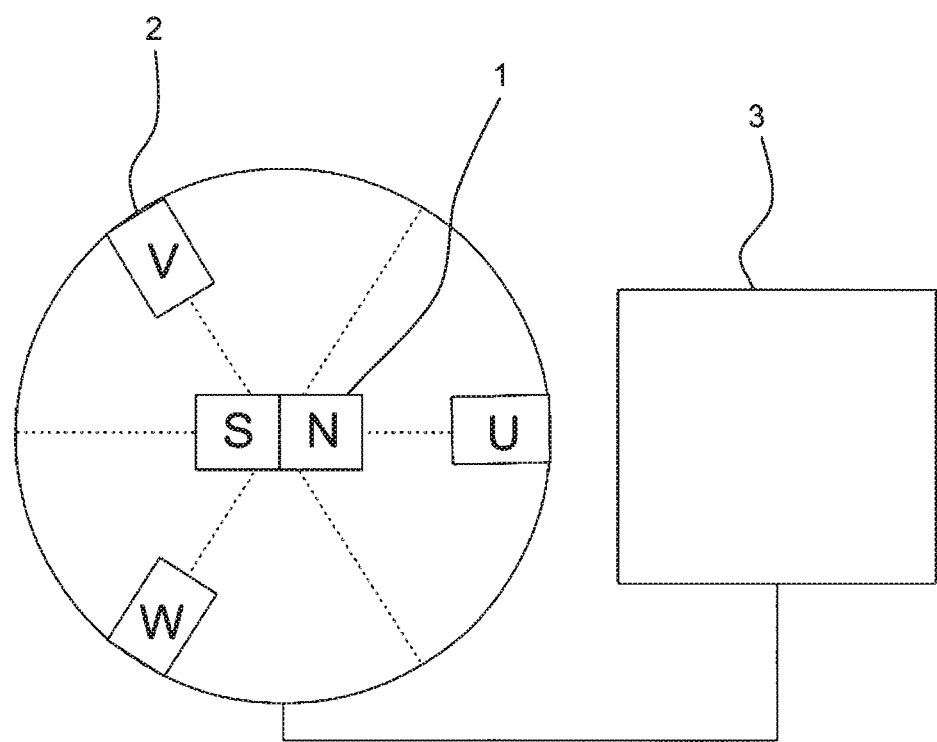
FIG. 1 schematic diagram of a BLDC motor,
FIG. 2 signal curve during the start of a BLDC motor,
FIG. 3 table.

FIG. 1 shows an embodiment of the BLDC motor which is capable to be started and operated using the method according to the invention. Only the components of the BLDC motor required for carrying out the method according to the invention are shown. In particular, the power supply is not shown here.

The BLDC motor comprises a rotor 1, a stator 2 and a control and evaluation unit 3. The rotor 1 has at least one permanent magnet the magnetic poles of which are marked with S and N for south pole and north pole. In this embodiment, the stator 2 has three stator coils each offset by 120°, wherein the phases assigned to the stator coils are designated as U, V and W in FIG. 1.

If the phases, which are spatially offset by 120°, are subject to the application of sinusoidal phase currents of the same amplitude, which are offset by 120° in time, a stator magnetic field rotating at constant speed is generated. The maximum torque of the rotor is reached when the stator magnetic field is positioned at an angle of 90° relative to the rotor.

Furthermore, an example of a method according to the invention is shown.

Here, FIG. 1 shows the principle structure of a BLDC motor used for the method.

Figure 2:
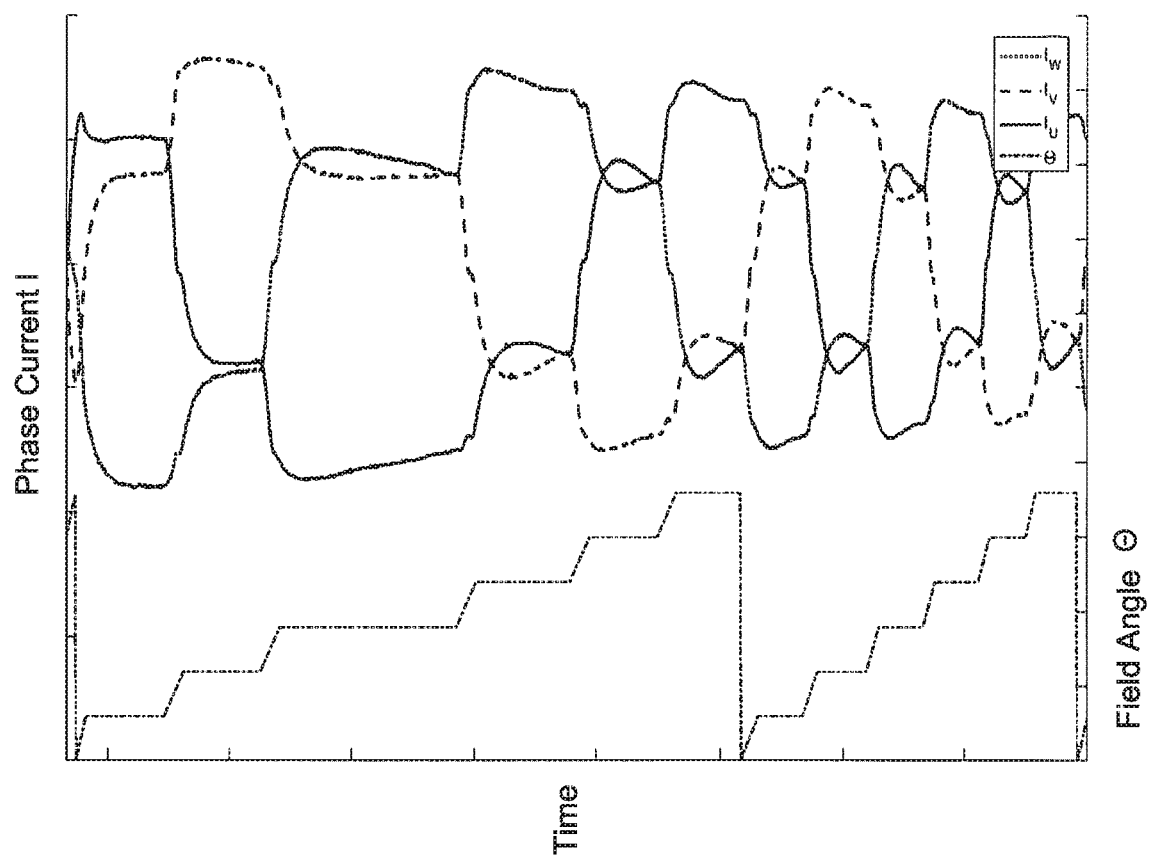

FIG. 2 shows a typical signal curve when the method is carried out with a BLDC motor during the start phase. The curves of the three phase currents I (IW, IV, IU) as well as the corresponding current field angle ($\Theta$) are shown over time. A rising part of the current field angle ($\Theta$) corresponds to a rising phase and a constant part of the current field angle ($\Theta$) corresponds to an analysis phase. At its maximum value, the current field angle ($\Theta$) equals 360°. This value corresponds to the end of a total cycle. As FIG. 2 further shows, the current field angle ($\Theta$) is entered with 0° again at the beginning of the following further total cycle.

FIG. 3 contains an associated table which includes a total cycle of the method according to the invention, which consists of six partial cycles, wherein the phases active in the individual partial cycles as well as the phase currents involved in the formation of the current eye are indicated. The position of the rotor assumed after the completion of a respective partial cycle is shown by means of the auxiliary lines offset by 60° included in FIG. 1.

Before the start of the first partial cycle, an initialisation phase is first carried out, in which a start time, an initial starting field angle of the stator magnetic field and an angle rising rate are defined. In the embodiment, the initial starting field angle is set to a value of 0°, which corresponds to the field direction of phase U. Phase V is correspondingly offset by 120° by definition, phase W by 240°.

Each of the partial cycles repeatedly carried out is divided into a rising phase and an analysis phase.

In the rising phase of the first partial cycle, the current field angle is increased at the previously defined angle rising rate from a starting field angle of 0° to a final field angle of 60°. In the first partial cycle, the starting field angle thus corresponds to the initial starting field angle, whereas in the following partial cycles the previous final field angle is declared to be the new starting field angle. The increase of the current field angle is caused by a change in the voltage application to the stator coils, which also causes a rotation of the rotor. In the first partial cycle, the active phases are the phases U and V, whereas the phase W remains at a value of zero.

In the subsequent analysis phase of the first partial cycle, the current field angle is kept constant at a value of 60° so that the phase currents only change due to the changes in the position of the rotor. In this phase, the current difference between the two phase currents of the same direction of flow is continuously recorded. In the first partial cycle, the two phase currents of the same direction of flow are the phase currents IU and IV.

The detected difference in current is monitored for the presence of a current eye which is being formed between a first and a second current crossover point. The first current crossover point describes the time of a first occurrence of a current difference of 0 between the phase currents IU and IV, whereas the second current crossover point describes the time of a second occurrence of a current difference of 0 between the phase currents IU and IV.

At the first current crossover point, the phase current IV is present as an increasing phase current and the phase current IU as a decreasing phase current. At the second current crossover point, the situation is reversed so that the phase current IU increases and the phase current IV decreases.

If a current eye could be detected, immediate commutation takes place and initiates the change to a next motor state. If no current eye is detected after a pre-definable time interval has elapsed, commutation also takes place and thus a change to the next motor state is effected.

In the second partial cycle, the current field angle is increased from 60° to 120° in the rising phase. In the analysis phase, the current field angle is kept constant at the value of the achieved final field angle of 120°. The active phases are again U and V. The phase currents involved in the formation of the current eye are to be assigned to phases W and U, wherein at the first current crossover point the phase current IW increases and the phase current IU decreases. To close the current eye, the phase current IU increases and the phase current IW decreases at the second current crossover point.

In the third partial cycle, the current field angle is increased from 120° to 180° in the rising phase. In the analysis phase, the current field angle is kept constant at the value of the achieved final field angle of 180°. The active phases are W and V. The phase currents involved in the formation of the current eye are to be assigned to phases W and V, with phase current IW increasing and phase current IV decreasing at the first current crossover point. To close the current eye, the phase current IV increases and the phase current IW decreases at the second current crossover point.

In the fourth partial cycle, the current field angle is increased from 180° to 240° in the rising phase. In the analysis phase, the current field angle is kept constant at the value of the achieved final field angle of 240°. The active phases are W and V. The currents involved in the formation of the current eye are to be assigned to phases U and V, wherein at the first current crossover point the phase current IU increases and the phase current IV decreases. To close the current eye, the phase current IV increases and the phase current IU decreases at the second current crossover point.

In the fifth partial cycle, the current field angle is increased from 240° to 300° in the rising phase. In the analysis phase, the current field angle is kept constant at the value of the achieved final field angle of 300°. The active phases are W and U. The currents involved in the formation of the current eye are to be assigned to the phases U and W, wherein at the first current crossover point the phase current IU increases and the phase current IW decreases. To close the current eye, the phase current IW increases and the phase current IU decreases at the second current crossing point.

In the sixth partial cycle, the current field angle is increased from 300° to 360° in the rising phase. In the analysis phase, the current field angle is kept constant at the value of the achieved final field angle of 360°. The active phases are W and U. The currents involved in the formation of the current eye are to be assigned to phases V and W, with phase current IV increasing and phase current IW decreasing at the first current crossover point. To close the current eye, the phase current IW increases and the phase current IV decreases at the second current crossover point.

After completion of the six partial cycles, the current field angle reaches a value of 360° so that a total cycle, which also corresponds to a complete rotation of the rotor, is finished.

According to the invention, the total cycle consisting of six partial cycles is now repeated until a pre-definable motor speed of the BLDC motor is reached. The requirements for a stable operation of the motor and a related motor speed can vary depending on the application.

LIST OF REFERENCE NUMERALS 1 rotor
2 stator
3 control and evaluation unit

The invention claimed is:

1. A method for starting and operating a brushless direct current motor having a rotor with exciter magnets, a stator with at least three stator coils, and a control and evaluation unit, wherein one phase current is always able to be applied to each of the at least three stator coils, and a rotating stator magnetic field is generated by the stator coils, the method comprising:
  a) carrying out an initialization phase having a defined start time, a defined initial starting field angle of the stator magnetic field and a defined angle rising rate;
  b) carrying out a partial cycle, including:
    b1) carrying out a rising phase by increasing a current field angle with a change in voltage application to the stator coils until a final field angle is reached which exceeds a starting field angle by 60°, wherein the starting field angle corresponds to the initial starting field angle when the rising phase is carried out for the first time and to a final field angle of a previous rising phase when the partial cycle is carried out repeatedly;
    b2) carrying out an analysis phase by keeping the current field angle due to the voltage application to the stator coils being kept constant, continuously recording a difference in current between two phase currents of a same direction of flow, the control and evaluation unit analyzing the recorded difference in current for the presence of a current eye, wherein the current eye is formed between a time of a first occurrence of a current difference of 0 between the two phase currents of the same direction of flow and a time of a second occurrence of a current difference of 0 between the two phase currents of the same direction of flow, where immediate commutation takes place when a current eye is detected or where without detection of a current eye, commutation takes place after a pre-definable time interval has elapsed, terminating the analysis phase after commutation has been carried out;

c) repeatedly carrying out the partial cycle until the final field angle has increased to a value of 360°, the partial cycles together defining a total cycle;

d) repeatedly carrying out the total cycle.

2. A brushless direct current motor, comprising:

a rotor having exciter magnets;

a stator having three stator coils configured for always having one phase current applied to each of the three stator coils and said stator coils configured for generating a rotating stator magnetic field;

a control and evaluation unit, said control and evaluation unit and said three stator coils configured for carrying out initialization phase having a defined start time, a defined initial starting field angle of the stator magnetic field, and a defined angle rising rate, said control and evaluation unit configured for carrying out a partial cycle having a rising phase and an analysis phase;

the rising phase being carried out by increasing a current field angle with a change in voltage application to said stator coils until a final field angle is reached which exceeds a starting field angle by 60°, the starting field angle corresponding to the initial starting field angle when the rising phase is carried out for the first time and to a final field angle of a previous rising phase when the partial cycle is carried out repeatedly;

the analysis phase being carried out by keeping the current field angle due to the voltage application to said stator coils being kept constant, continuously recording a difference in current between two phase currents of a same direction of flow, the control and evaluation unit analyzing the recorded difference in current for the presence of a current eye, wherein the current eye is formed between a time of a first occurrence of a current difference of 0 between the two phase currents of the same direction of flow and a time of a second occurrence of a current difference of 0 between the two phase currents of the same direction of flow, where immediate commutation takes place when a current eye is detected or where without detection of a current eye, commutation takes place after a pre-definable time interval has elapsed, terminating the analysis phase after commutation has been carried out;

wherein the partial cycle is repeated until the final field angle has increased to a value of 360° and a total cycle is achieved when the final field angle increases to 360°;

wherein the total cycle is configure configured to be carried out repeatedly.

\* \* \* \* \*